United States Patent [19]
McCormack

[11] 3,820,899
[45] June 28, 1974

[54] POWER AND SURFACE INSPECTION ADAPTOR PLATE
[75] Inventor: Harley G. McCormack, Elgin, Ill.
[73] Assignee: American Hydrophilics Corporation, Elgin, Ill.
[22] Filed: Sept. 29, 1972
[21] Appl. No.: 293,477

[52] U.S. Cl. .................................. 356/124, 350/92
[51] Int. Cl. ............................................. G01b 9/00
[58] Field of Search .......................... 356/124–127, 356/244, 246; 350/92, 95, 84

[56] References Cited
UNITED STATES PATENTS
| 3,019,708 | 2/1962 | French, Jr. et al. | 356/244 |
| 3,027,804 | 4/1962 | Wesley et al. | 356/124 |
| 3,494,700 | 2/1970 | Wilms | 356/125 |

Primary Examiner—Ronald L. Wibert
Assistant Examiner—Conrad Clark
Attorney, Agent, or Firm—Olson, Trexler, Wolters, Bushnell & Fosse, Ltd.

[57] ABSTRACT

The embodiment of the invention disclosed herein is directed to a power and surface inspection plate to be adapted to conventional optical measuring instruments such as lensometers, biomicroscopes or the like. The adaptor plate is positioned in the viewing area of the optical measuring instrument and receives a flexible hydrophilic contact lens which is to have the lens power or surface thereof tested or inspected, respectively. An annular embossment is formed on the top side of the inspection plate. The embossment has an arcuately inwardly directed configuration at the upper annular edge thereof conforming substantially to the configuration of the convex surface of a contact lens to be placed thereupon.

3 Claims, 5 Drawing Figures

PATENTED JUN 28 1974 3,820,899
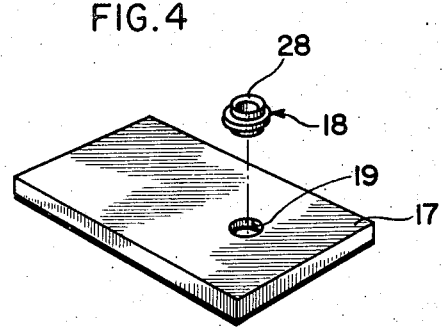
FIG. 4
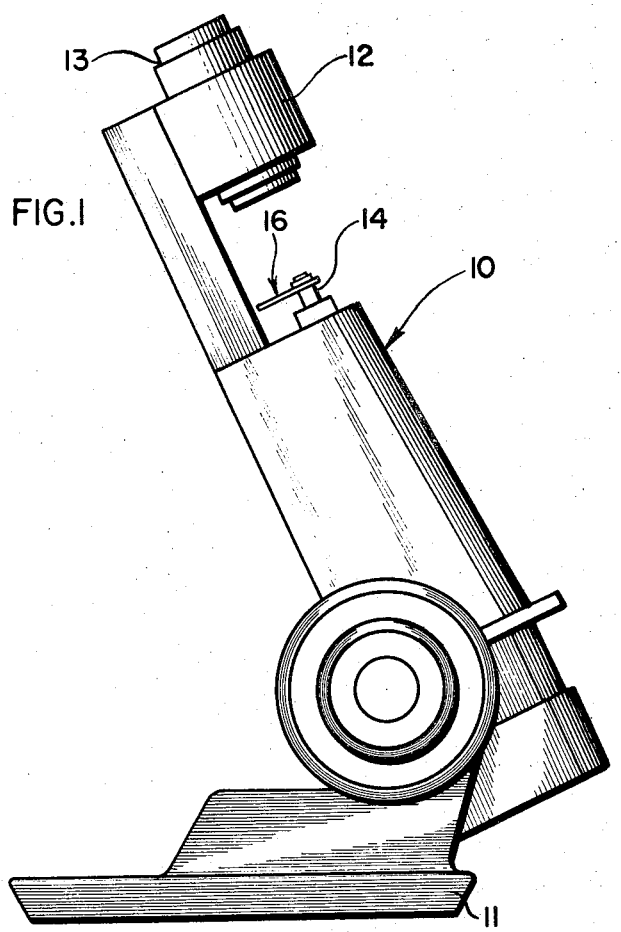
FIG. 1
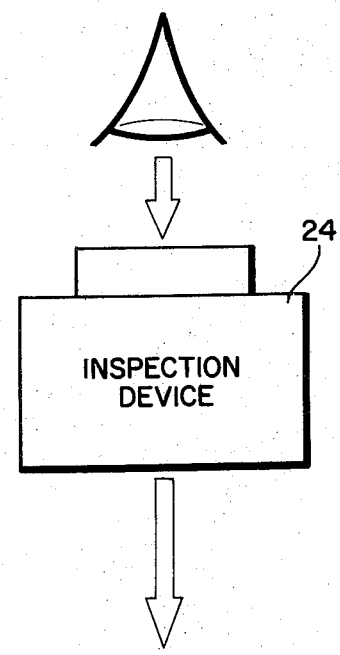
FIG. 5
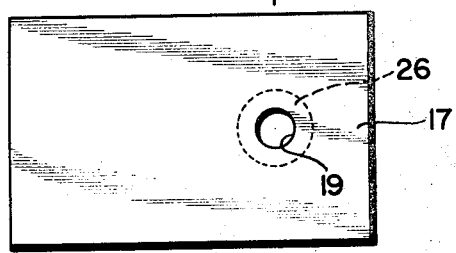
FIG. 2
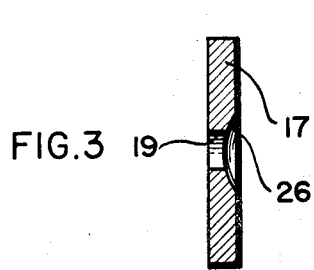
FIG. 3
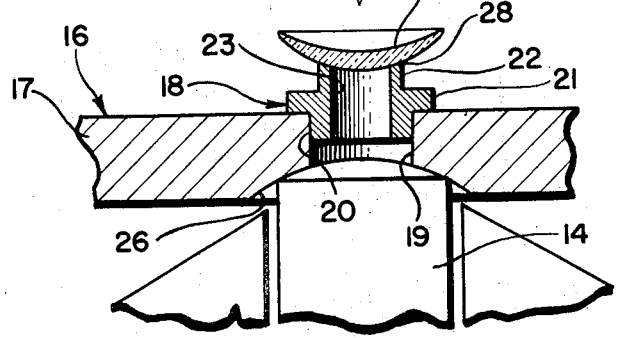

POWER AND SURFACE INSPECTION ADAPTOR PLATE

BACKGROUND OF THE INVENTION

This invention relates to apparatus for use with contact lenses of the type to be worn against the cornea, and more particularly is directed to apparatus used to test flexible hydrophilic contact lenses with conventional optical measuring equipment.

There are a great many different instruments available to measure the power of optical corrective lenses, such as standard rigid contact lenses, commonly referred to as non-flexible contact lenses. Many of the instruments used for such optical measurement require that the optical viewing mechanism thereof be positioned at an angle in the order of for example, 45° from the horizontal. In some of these optical measuring instruments the viewing angle can be varied, but they are generally tilted in only small amounts of inclination and at no time do they approach a vertical position so that the viewing surface or support thereof is horizontal. Without a horizontal pedestal or receiving station it is difficult to position the new flexible hydrophilic contact lenses for measurement.

Most power measuring instruments in use today, or available for use cannot be adapted to a vertical alignment. However, some of the newer optical measuring instruments have adjustments thereon to allow vertical positioning of the viewing apparatus so that the receiving support can be placed in a horizontal plane.

With the recent development of the new, flexible hydrophilic contact lenses, the problems of measuring power with the conventional instruments have not been solved, and many laboratories and technicians will not go through the expense of buying new equipment to test such lenses. It is difficult, if not impossible to measure power of the flexible hydrophilic contact lenses with conventional equipment that does not offer the vertical adjustment of the optical system. However, even in the case of optical measuring equipment with the vertical adjustment a special procedure of drying the surface of the lenses by blotting is necessary to insure proper measurement.

When utilizing optical measuring equipment having a tilted arrangement of the optical system it is necessary to hand-hold the flexible hydrophilic contact lens in the instrument so that it will not slide off the viewing support. However, by hand-holding the lens the optical quality is distorted. In the past, the power of non-flexible lenses has been measured by supporting the lens on a flat plate and, either hand-holding the plate or supporting the plate to the optical measuring instrument by the use of double-sided adhesive material such as tape or pads. The flat plate then contains an aperture for the optical system to view the lens.

SUMMARY OF THE INVENTION

Accordingly, it is an object of this invention to provide a power measuring and surface inspection adaptor plate to be used with conventional optical measuring instruments.

Briefly, the adaptor plate of this invention has dual purposes. Firstly, the adaptor plate can be used as a power testing plate since it is specifically designed to support a flexible hydrophilic contact lens at an angle of inclination from the vertical without sliding or falling off the optical measuring instrument. Secondly, the adaptor plate can be used as a stage to support the lens in a vertical manner for inspectional purposes in the focal plane of a biomicroscope. The adaptor plate has a bushing insert, which can be made from the end of a small pipe or tube of black plexiglass, inserted into an aperture formed in the plate. The bushing has an inside diameter of approximately .220 inches providing an aperture for the optical system. The wall thickness of the tube is in the order of 0.4 mm and its end surface has a lathe cut configuration and polished to a radius of approximately 8.5 mm. This lathe cut is an arcuately inwardly directed configuration at the upper annular edge of the bushing and the radius of 8.5 mm is selected to conform substantially to the radius of curvature of the convex surface of the contact lens to be placed thereupon. The thinness of the wall of the tubing forming the bushing is selected so as not to distort the surface of the lens, a condition which can occur when using bushings having too great a thickness. The concave surface formed about the annular upper periphery of the bushing is provided to gain additional adhesive support to hold the lens without distortion while taking a measurement.

The height of the tube, or bushing, projecting above the surface of the adaptor plate is in the order of 0.07 inches, this supports the lens free of the surface of the plate and yet allows minimum spacing between the lens and the optical system so that no significant effect is obtained on the vertex distance.

The reverse side of the plate has a recessed cavity which is ground to a radius of 12.2 mm. This ground radius serves a dual purpose. It primarily serves as a self-centering device to be able to easily align the center of the lens with the center of the optical system in the instrument on which it is placed. The recess further serves to reduce the axial distance from the end of the power measuring instrument to the surface of the lens thereby reducing the need for vertex consideration.

The support adaptor plate preferably is formed of black plexiglass and polished to a mirror surface.

Accordingly, many other objects, features and advantages of this invention will be more fully realized and understood when taken in conjunction with the accompanying drawings wherein like reference numerals throughout the various views of the drawings are intended to designate similar elements or components.

BRIEF DESCRIPTION OF THE DRAWINGS

FIG. 1 is a side elevational view of an optical measuring instrument which shows a typical instrument upon which the adaptor plate of this invention can be used;

FIG. 2 is a top view of the adaptor plate of this invention;

FIG. 3 is an end view taken along section line 3—3 of FIG. 2;

FIG. 4 is a perspective exploded view showing the adaptor plate and bushing associated therewith; and FIG. 5 is an enlarged sectional and partially diagrammatic view of the inspection plate and its intended use.

DETAILED DESCRIPTION OF THE ILLUSTRATED EMBODIMENT

Referring now to FIG. 1 there is seen an optical measuring instrument designated generally by reference numeral 10. The optical measuring instrument 10 includes a support base 11 upon which rests an optical unit 12 angularly disposed from the vertical, as shown. Positioned at the upper end of the optical unit 12 is an eyepiece 13 to view objects placed upon the viewing stage 14.

In accordance with the principles of this invention a power and surface inspection adaptor plate 16 is positioned upon the viewing stage 14. The use of the adaptor plate 16 allows flexible hydrophilic contact lenses to be positioned upon the optical measuring instrument, and when angularly disposed as shown, the lens will not fall off the viewing stage.

FIG. 5 illustrates in more detail the construction of the adaptor plate 16 and its use in conjunction with the optical measuring instrument. The adaptor plate 16 comprises a flat plate element 17 upon which is positioned a bushing 18. The bushing 18 is inserted into an aperture 19 formed in the plate. This is accomplished by providing a first reduced diameter portion 20 to be inserted into the aperture 19. Immediately adjacent the first reduced diameter portion 20 is a flange portion 21 which engages the plate 19 and forms a stop member for the bushing. Extending upwardly from the flange 21 is a second reduced diameter portion 22, here being shown of lesser diameter than the first reduced diameter portion. An aperture 23 is formed through the bushing and is placed substantially in viewing registry with the viewer 24 positioned thereabove, the viewer 24 forming either a microscope or any other suitable inspection device, and it being understood that it corresponds substantially to the optical measuring instrument 10 of FIG. 1.

The bottom surface of the flat plate element 17 is provided with a concave polished recess 26 which is used for aligning the plate and which reduces the thickness of the plate in the region of the bushing so that the distance between the viewing stage 14 of the power measuring instrument 10 and the convex surface of the lens is kept at a minimum. The concave recess 26 also insures quick and accurate alignment of the unit in the viewing area of the optical measuring instrument.

Most advantageously, the upper edge portion of the bushing 18 forms an annular embossment extending upwardly of the plate. The annular embossment has the topmost edge thereof provided with an arcuately inwardly directed configuration having a concave curvature. This concave curvature has a radius of curvature similar to the convex radius of curvature of the contact lens 29 positioned thereon. By so providing a concave edge configuration 28, increased annular surface area is obtained to more firmly hold the contact lens by means of friction engagement. This then allows the power and surface inspection adaptor plate to be placed on the optical measuring instrument 10 at an angle of inclination as shown without fear that the contact lens will fall off.

Accordingly, what has been described is a simple and efficient power and surface inspection adaptor plate used to facilitate the measurement and inspection of flexible hydrophilic contact lenses. Many suitable variations and modifications of this invention may be effected without departing from the spirit and scope of the novel concepts disclosed and claimed herein.

The invention is claimed as follows:

1. A power and surface inspection plate for adaptably receiving a flexible hydrophilic contact lens, comprising: plate means for positioning in the viewing area of an optical measuring instrument, an annular embossment formed on one side of said plate means upon which the convex surface of a flexible hydrophilic contact lens is placed, said annular embossment having a relatively thin annular wall defining an aperture centrally through said annular embossment, said annular wall forming a ring-like lens engaging surface having substantially at the same radius of curvature as the lens to be placed in contact therewith, and a concave recess formed on the opposite side of said plate means to facilitate positioning and alignment of said plate means on an optical measuring instrument, said annular embossment adapted to be in registry with the optical viewing mechanism of said optical measuring instrument so that the lens can be viewed through said aperture.

2. The power and surface inspection plate according to claim 1 wherein said annular embossment is formed of an annular bushing inserted into an aperture formed through said plate means, said annular bushing having a first reduced diameter portion inserted into said aperture, a flange portion immediately adjacent said first reduced diameter portion to form a stop against said plate means, and a second reduced diameter portion extending upwardly from said flange portion for receiving the flexible hydrophilic contact lens to be analyzed.

3. The power and surface inspection plate according to claim 1 wherein said alignment means formed on said plate means is a concave surface formed in axial alignment with the aperture formed through said plate means.

* * * * *